(12) United States Patent
Winkler

(10) Patent No.: US 6,601,904 B2
(45) Date of Patent: *Aug. 5, 2003

(54) RETRACTABLE AWNING WITH TRANSITION PLATE FOR A GOLF CART

(75) Inventor: David R. Winkler, Pacific, MO (US)

(73) Assignee: Covered Solutions, Inc., Pacific, MO (US)

( * ) Notice: Subject to any disclaimer, the term of this patent is extended or adjusted under 35 U.S.C. 154(b) by 38 days.

This patent is subject to a terminal disclaimer.

(21) Appl. No.: 09/827,327

(22) Filed: Apr. 2, 2001

(65) Prior Publication Data

US 2002/0027373 A1 Mar. 7, 2002

Related U.S. Application Data

(63) Continuation-in-part of application No. 09/634,437, filed on Aug. 8, 2000, now Pat. No. 6,220,647.

(51) Int. Cl.$^7$ .................................................. B60J 7/08
(52) U.S. Cl. ............. 296/100.14; 296/111; 280/DIG. 5; 135/88.01
(58) Field of Search ................................ 296/111, 77.1, 296/100.14, 107.02, 97.21, 107.09, 78.1, 136, 118; 280/DIG. 5, DIG. 6; 135/88.01, 88.02, 88.09; 150/159

(56) References Cited

U.S. PATENT DOCUMENTS

| 208,564 A | 10/1878 | Bowers |
|---|---|---|
| 1,470,630 A | 10/1923 | Mahr |
| 2,689,579 A | 9/1954 | Sartori |
| 3,671,071 A | 6/1972 | Evinrude |
| 4,008,874 A | 2/1977 | Conway, Jr. |
| 4,013,315 A | 3/1977 | West |
| 4,037,614 A | 7/1977 | Hines et al. |
| 4,098,536 A | 7/1978 | Mills |
| 4,469,114 A | 9/1984 | Kelley et al. |
| 4,641,879 A | 2/1987 | Kassai |
| 4,830,037 A | 5/1989 | Held |
| 4,846,524 A | 7/1989 | Gerber |
| 5,010,941 A | 4/1991 | Ross, Sr. et al. |
| 5,058,943 A | 10/1991 | Louderback |
| 5,069,481 A | 12/1991 | Strange |
| 5,072,987 A | 12/1991 | Allen |
| 5,146,967 A | 9/1992 | Chapman |

(List continued on next page.)

FOREIGN PATENT DOCUMENTS

DE            3517967 A1     11/1985

Primary Examiner—Joseph D. Pape
(74) Attorney, Agent, or Firm—Thompson Coburn LLP

(57) ABSTRACT

A retractable awning for attachment to a golf cart is provided. The awning is comprised of a framework having a plurality of U-shaped rib members and a fabric cover. The U-shaped rib members have ends terminating at a common pivot point to allow respective relative movement to move the awning between an extended deployed position and a retracted closed position over a rear compartment of the golf cart. Each successively adjacent rib member is dimensioned slightly less than its preceding rib member to allow nesting of all the rib members in a common plane so that the framework can lie substantially flat in its retracted position. Sleeve members for receiving the rib members are provided on the underneath side of the awning cover to allow the fabric to deploy and retract over the framework without binding. The framework is mounted to the cart through one of several disclosed arrangements including a transition plate extending between the forward rib member and a top mounting bracket in one arrangement.

21 Claims, 18 Drawing Sheets

U.S. PATENT DOCUMENTS

| | | |
|---|---|---|
| 5,184,865 A | 2/1993 | Mohtasham et al. |
| 5,190,340 A | 3/1993 | Nuscher |
| 5,310,235 A | 5/1994 | Seymour et al. |
| 5,551,745 A | 9/1996 | Huang |
| 5,588,690 A | 12/1996 | Showalter |
| 5,688,018 A | 11/1997 | Simpson |
| 5,741,041 A | 4/1998 | Sullivan |
| 6,007,134 A | 12/1999 | Weston |
| 6,068,325 A | 5/2000 | Hughes |
| 6,216,714 B1 * | 4/2001 | Tucker .................... 135/88.01 |
| 6,227,217 B1 * | 5/2001 | Peta ......................... 296/83 X |
| 6,227,603 B1 * | 5/2001 | Brock ................... 296/100.14 |

* cited by examiner

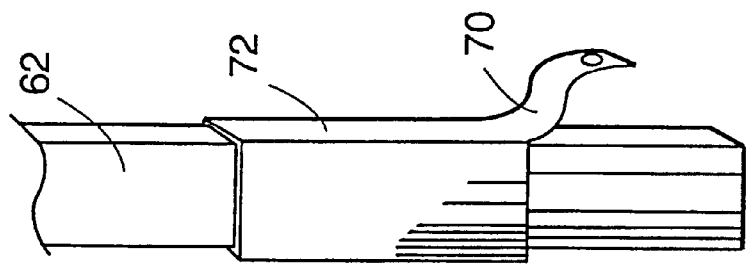
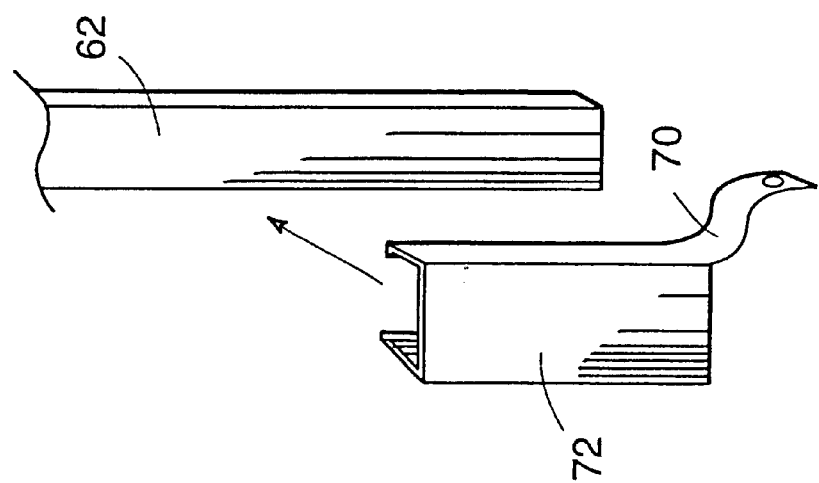
Fig. 5

RETRACTABLE AWNING WITH TRANSITION PLATE FOR A GOLF CART

RELATED APPLICATION

This application is a continuation-in-part of application Ser. No. 09/634,437, filed Aug. 8, 2000, now U.S. Pat No. 6,220,647, issued Apr. 24, 2001.

BACKGROUND OF THE INVENTION

This invention relates to coverings and awnings for golf carts. A standard golf cart has an area for stowage of golf clubs and other equipment at the rear of the cart. While the cart's roof covers persons riding in the cart, it leaves the equipment in the stowage area uncovered. Golfing equipment can be very expensive, and it is undesirable for it to get wet because of rain. As such, a cover extending over the rear stowage area of the cart is desirable. However, ready access by a golfer to his equipment is essential, so the cover should not obstruct the golfer's ability to reach for clubs as needed. Further, if rainy conditions are not present, the cover is not needed and must be moved out of the way. There exist retractable covers that extend over the cart's stowage area, but they often do so in a cumbersome fashion. While some covers, when deployed, may do an adequate job in keeping rain off the equipment, they do not fold away in a neat, compact fashion when retracted after use. Still other disadvantages found in the prior art designs include inconvenient mounting arrangements for attaching the cover to the golf cart, supporting frameworks which are cumbersome and unduly complicated and which do not adequately support the fabric, and inadequate mounting arrangements for securing the cover to the golf cart at or near the canopy top thereof. This is especially a problem in that there are several major manufacturers of golf carts who have varying arrangements for their canopy tops, some of which have curvilinear edges not readily suited to alignment with a standardized bracket member. Furthermore, as there is concern in providing clearance for the removal and replacement of golf clubs from the golf bags as they are carried near the rear portion of the golf cart, these canopy tops are generally shortened and do not extend into the area immediately above the golf bag compartment. This then provides a challenge for the cover in that it must conveniently extend to provide adequate rain cover for golf bags but yet be readily collapsible up and out of the way of the bags and their clubs. As a result, care must be taken in designing and implementing a supporting framework. In other words, the framework must be large enough to allow for it being extended a substantial distance behind the rear portion of the top assembly which necessarily makes it "substantial" having some degree of relative size which increases its weight and complexity. With this added weight and complexity, mounting and operation become important issues as the cover must give the appearance and feel of a quality product in this luxury setting.

SUMMARY OF THE INVENTION

By means of the instant invention there is provided a retractable awning for the rear equipment stowage area of a golf cart. The awning is comprised of a framework having a fabric covering extended over a plurality of U-shaped rib members joined in pivoting relationship at their ends at a common pivot point. The rib members are moveable relative to each other so that the awning can be moved in fan-like fashion between an open, deployed position to a closed, retracted position. A first top rib member forms the top, forward lateral edge of the awning, and each successive rib member supports a portion of the fabric to give structural shape to the awning in its deployed state. Each successive rib member has an incrementally smaller dimension than its preceding rib member such that all the rib members can be nested together in a common plane when the awning is in the closed retracted position. Sleeves are disposed on the inner surface of the fabric to receive the rib members which allows the fabric to deploy smoothly over the framework. A fabric flap is provided with the awning to enable the loose awning fabric to be gathered neatly together when the awning is held against the rear edge of the cart's roof in the closed retracted state.

Several arrangements are shown for mounting the awning to the golf cart. In a first arrangement, the awning is attached to the rear of a golf cart by fastening the top rib member to the rear edge area of the roof of the golf cart. The respective pivot points of the rib members are supported against the cart's vertical support posts. Alternately, the first top rib member is supported along its vertical length to the cart's vertical support post with the pivot points being freely suspended. The support for the first top rib member may be provided in a number of ways. One option is to provide two support brackets which extend between each side of the first top rib member and its corresponding upstanding support arm provided by the golf cart manufacturer for supporting the preexisting canopy top. In this arrangement, a transition plate is provided attached to the medial portion of the first top rib member with an upturned flange with cushioning for being tucked up under the overhanging lip of the canopy top. This provides an overlapping arrangement which may either be spaced apart or urged against each other to allow for a smooth and clean transition between the add on awning cover and the golf cart. Depending upon the choice made by the designer, the awning may thus be spaced apart from the canopy top or urged against it by locating the mounting brackets appropriately. As can be appreciated, switching between these alternatives is readily available by loosening and relocating the brackets.

Still another alternative for mounting the awning cover to the golf cart includes providing a top mounting bracket which itself is substantially U-shaped and which extends between upstanding support members of the canopy top on opposite sides of the cart and to which it may be conveniently bolted in fixed position. As a typical golf cart does not provide a support framework including a bracket or other member extending across the back of the canopy top, this top mounting bracket provides a fixed and solid connection point for the transition plate. Thus, the transition plate may itself be conveniently bolted to the top mounting bracket which in turn is bolted to the upstanding support members of the golf cart itself. This provides a solid bolted connection for supporting the awning cover to the integral framework supporting the canopy top. In several prior art designs, covers are secured to the canopy top itself instead of any supporting framework which is not particularly desirable in that the canopy tops are universally provided as molded plastic members. Thus, prior art covers attached to the molded plastic canopy top are not nearly as securely mounted to provide the solid and substantial mounting of the present invention. This can be important in that many golf carts are rented and subject to abuse by their users.

It is therefore an object of the present invention to provide a retractable awning for attachment to the rear of a golf cart to protect equipment stored in the cart's stowage area. Another object of the invention is to provide a retractable awning having a framework comprised of rib members that nest together in planar alignment when in a closed retracted position. Still another object of the invention is to provide a retractable awning having a framework surrounding substantially the periphery of the fabric cover. Yet another object of the invention is to provide a retractable awning having a transition plate for transitioning between the fabric awning and the canopy top of the golf cart to thereby allow the awning to be spaced further rearward to thereby optimize its positioning over the golf bag compartment area of the cart. Still another object of the invention is to provide a retractable awning with a supporting framework including a top mounting bracket which itself is substantially U-shaped for being bolted to opposite sides of the golf cart upstanding support members and the transition plate to thereby provide a solid bolted connection between the forward edge of the awning and the supporting framework of the golf cart. Another object of the invention is to provide a retractable awning having a framework including a first rib member at the forward edge of the fabric cover which itself is secured directly to the upstanding support members by a pair of brackets on each side of the golf cart to thereby securely fasten the awning cover to the golf cart without being secured to the canopy top of the golf cart. Yet another object of the invention is to provide a retractable awning having a framework comprised of a nesting plurality of U-shaped rib members for readily being moved between an extended deployed position and a retracted stored position. These and other objects of the present invention are realized in the preferred embodiment of the present invention, described by way of example and not by way of limitation.

Additional objects, advantages and novel features of the present invention will be set forth in the description which follows, and will become apparent to those skilled in the art upon examination of the following more detailed description and drawings in which like elements of the invention are similarly numbered throughout.

DESCRIPTION OF THE DRAWINGS

FIG. 5 is a view showing a mounting embodiment in which the bottom portion of the awning is attached to a support post of a golf cart.

DESCRIPTION OF THE INVENTION

Figure 1:
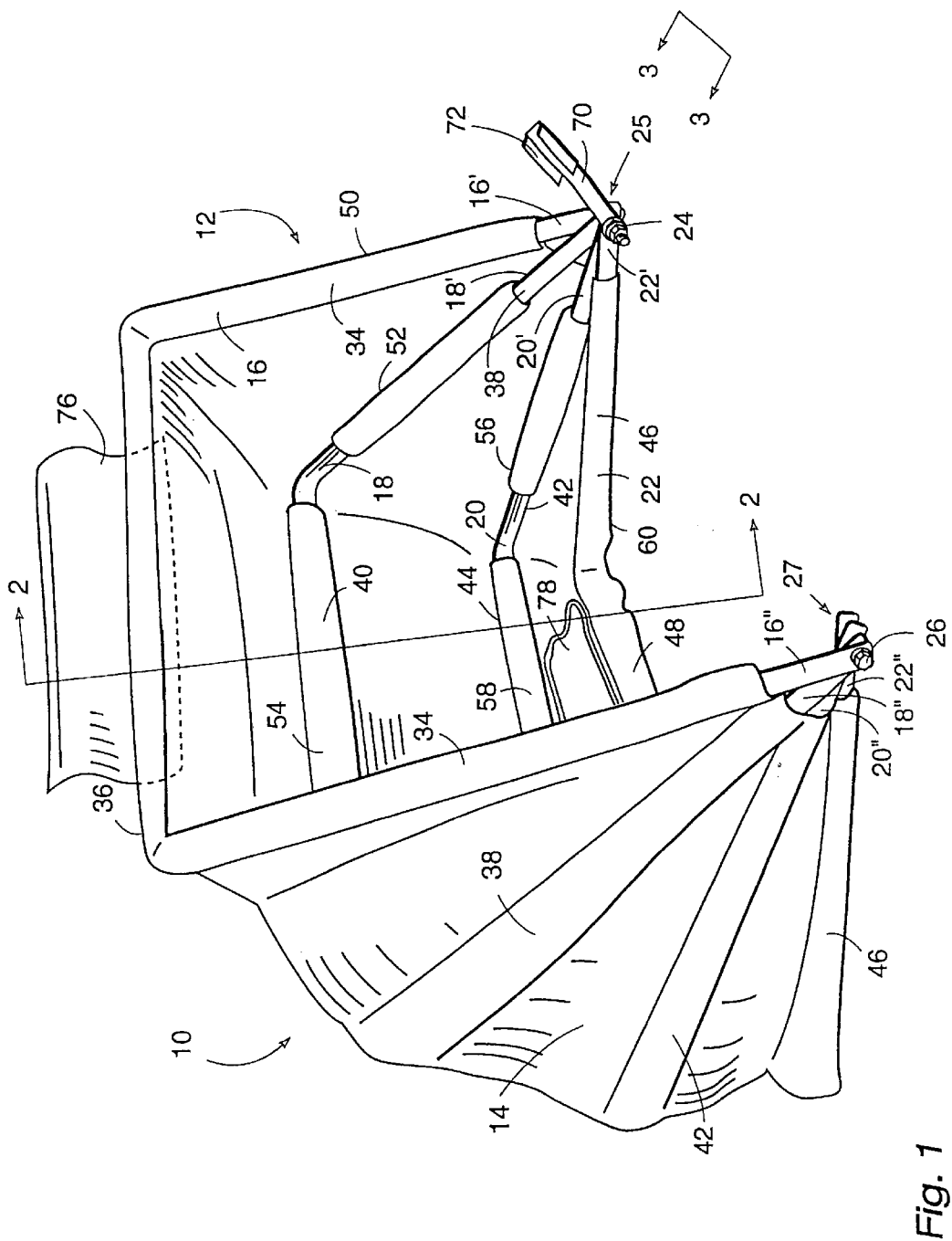
FIG. 1 is a perspective view of the awning in a partially open state.
Figure 3:
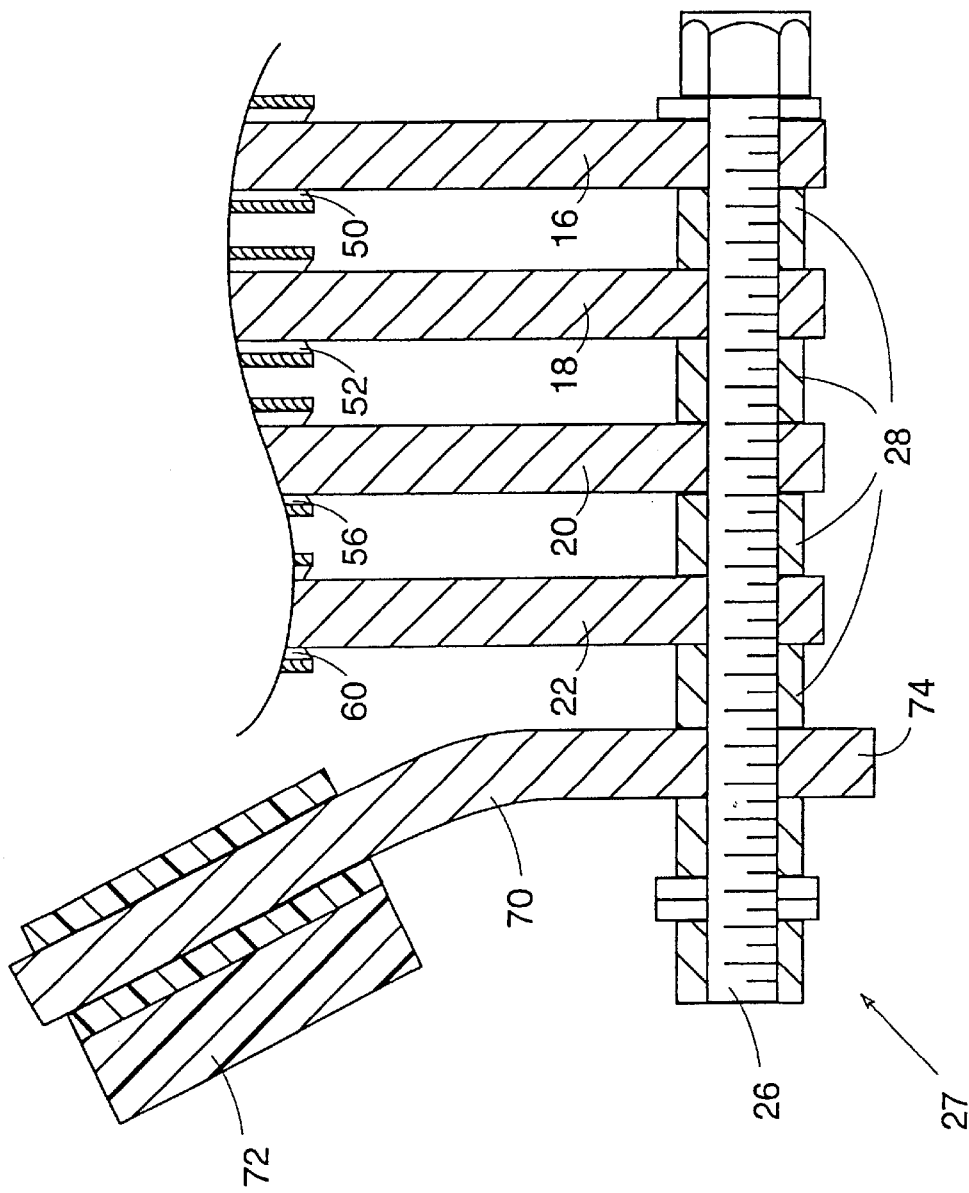
FIG. 3 is a cross-sectional view of a pivot point of the awning framework taken in side elevation along lines 3—3 in FIG. 1.

The awning attachment of the present invention, which is generally indicated by the reference numeral 10, is shown in FIG. 1. It is comprised of a framework 12 which supports a fabric covering 14. Framework 12 is comprised of a series of U-shaped rib members 16, 18, 20 and 22, each having ends 16', 16'', 18', 18'', 20', 20'', 22' and 22'', respectively. While additional, or fewer, rib members may be employed, four rib members provides the optimum number to adequately provide support for the fabric covering and give it a pleasing, gently arcuate shape. The respective rib member ends are connected together by bolts or pins 24 and 26, as shown in FIGS. 1 and 3, to create common pivot points 25 and 27, respectively, by which the rib members may be moved relative to each other. Bushing 28 are provided along bolts 24 and 26 between the rib member ends to provide adequate separation thereof to facilitate relative movement of the rib members when fanned out. A sufficient amount of fabric covering 14 is provided to enable the awning, when deployed, to extend arcuate from the rear edge section 30 of the roof of the cart to a point slightly beyond the rear edge of the cart, and to a level approximately even with the seats of the cart, so as to effectively cover the top of a golf club bag 32 held upright in the storage compartment as shown in FIG. 4.

Figure 2:
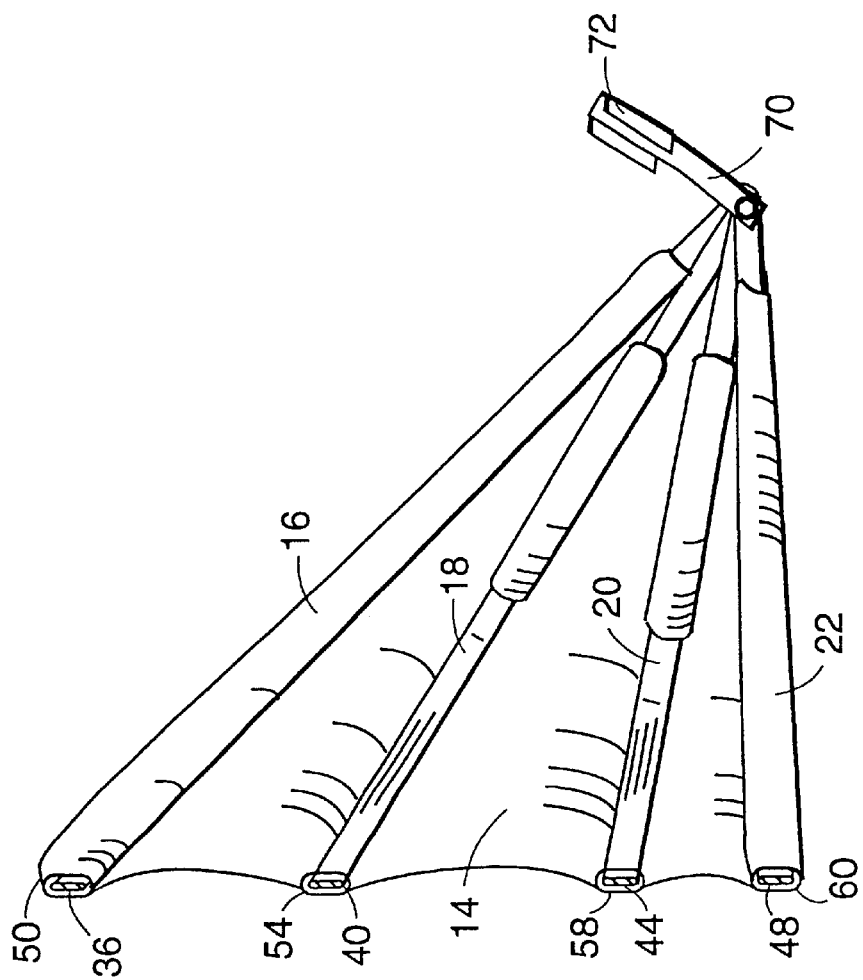
FIG. 2 is a cross-sectional view of the awning framework taken in side elevation along lines 2—2 in FIG. 1.

Sleeves are disposed on the forward and rear edges and underneath side of fabric cover 14 by sewing or the like to receive the rib members as shown in FIGS. 1 and 2. The sleeves allow a certain freedom of movement of the fabric cover along the rib members to facilitate deployment and retraction of the awning. Sleeve 50 is formed around the perimeter front lateral edge of fabric cover 14 and receives arms 34 and cross piece 36 of rib member 16. Sleeves 52 and 54 receive arm 38 and cross piece 40, respectively, of rib member 18. A corresponding sleeve 52 on the opposite interior side of fabric 14 receives the other arm 38. Similarly, sleeves 56 and 58 receive arms 42 and cross piece 44, respectively, of rib member 20. Sleeve 60 is formed around the perimeter rear lateral edge of fabric cover 14 and receives arms 46 and cross piece 48 of rib member 22.

Figure 6:
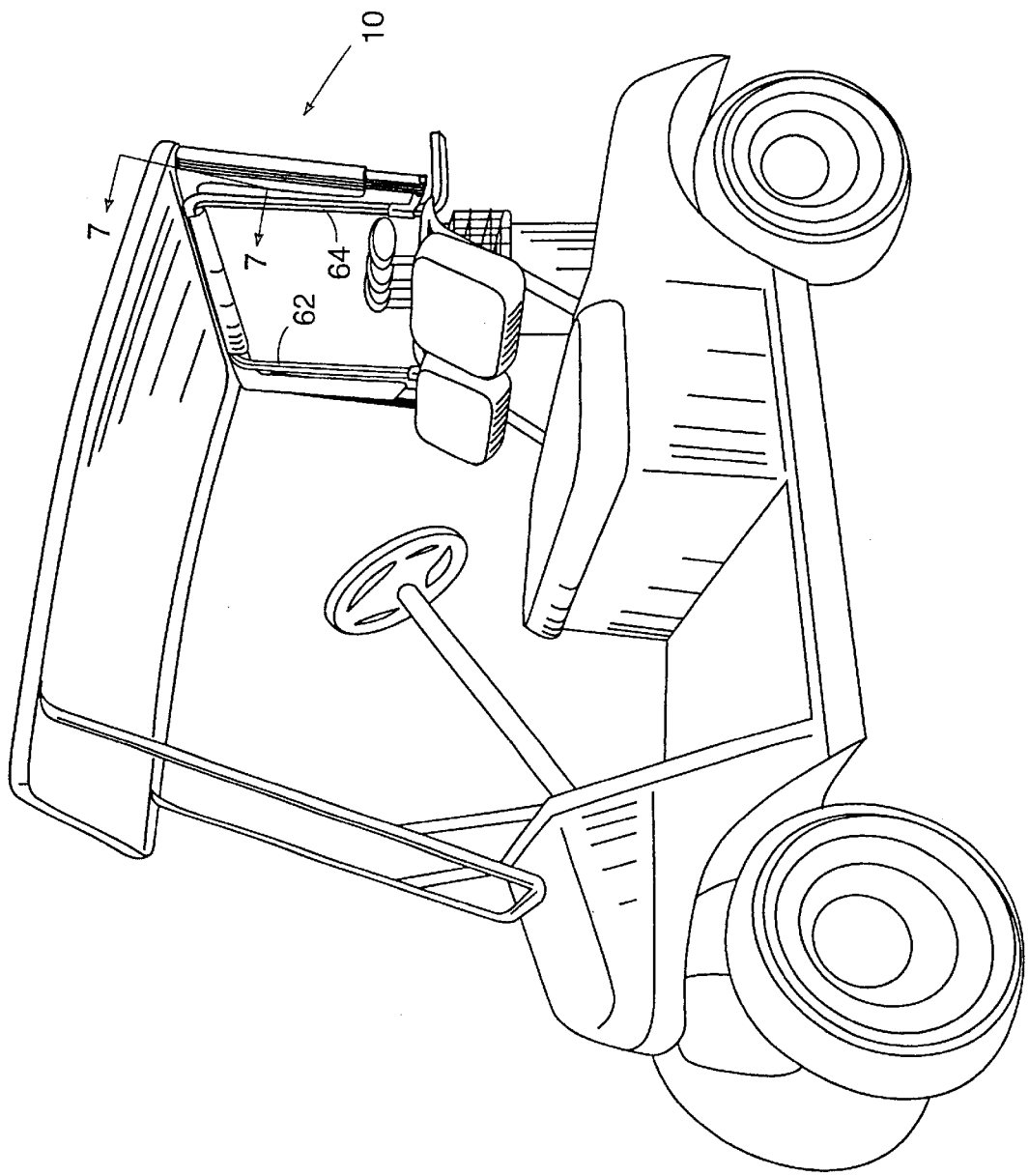
FIG. 6 is a perspective view of the awning in a retracted state on the back of a golf cart.

Each successive rib member after the first top rib member has an incrementally shorter dimension with respect to both its length and width so that the entire framework may lie substantially flat in a nesting relationship when in the closed retracted position shown in FIG. 6. As further shown in FIG. 1, rib member 16 comprises arms 34 and cross piece 36. Rib member 18 comprises arms 38, which are around ½ to one inch shorter than arms 34 of rib member 16, and cross piece 40, which is around one to two inches shorter than cross piece 36 of rib member 16. Likewise, rib member 20 comprises arms 42 and cross piece 44, which are respectively around VD to one inch shorter than arms 38 and around one to two inches shorter than cross piece 40 of rib member 18. Further, rib member 22 comprises arms 46 and cross piece 48, which are respectively around ½ to one inch shorter than arms 42 and around one to two inches shorter than cross piece 44 of rib member 20. The dimensions may vary due to the thicknesses of the rib members and fabric cover 14 held between the rib members. This arrangement allows each successive rib member to be nested within the forwardly preceding rib member in a planar relationship. Rib members 16–22 substantially flat in cross section which facilitates their side-by-side placement at pivot points 25 and 27 and also allows the nesting relationship shown in FIGS. 3 and 6. Bushing 28 keep the rib members spaced apart to provide room for the fabric sleeve material sandwiched between the rib members.

Figure 4:
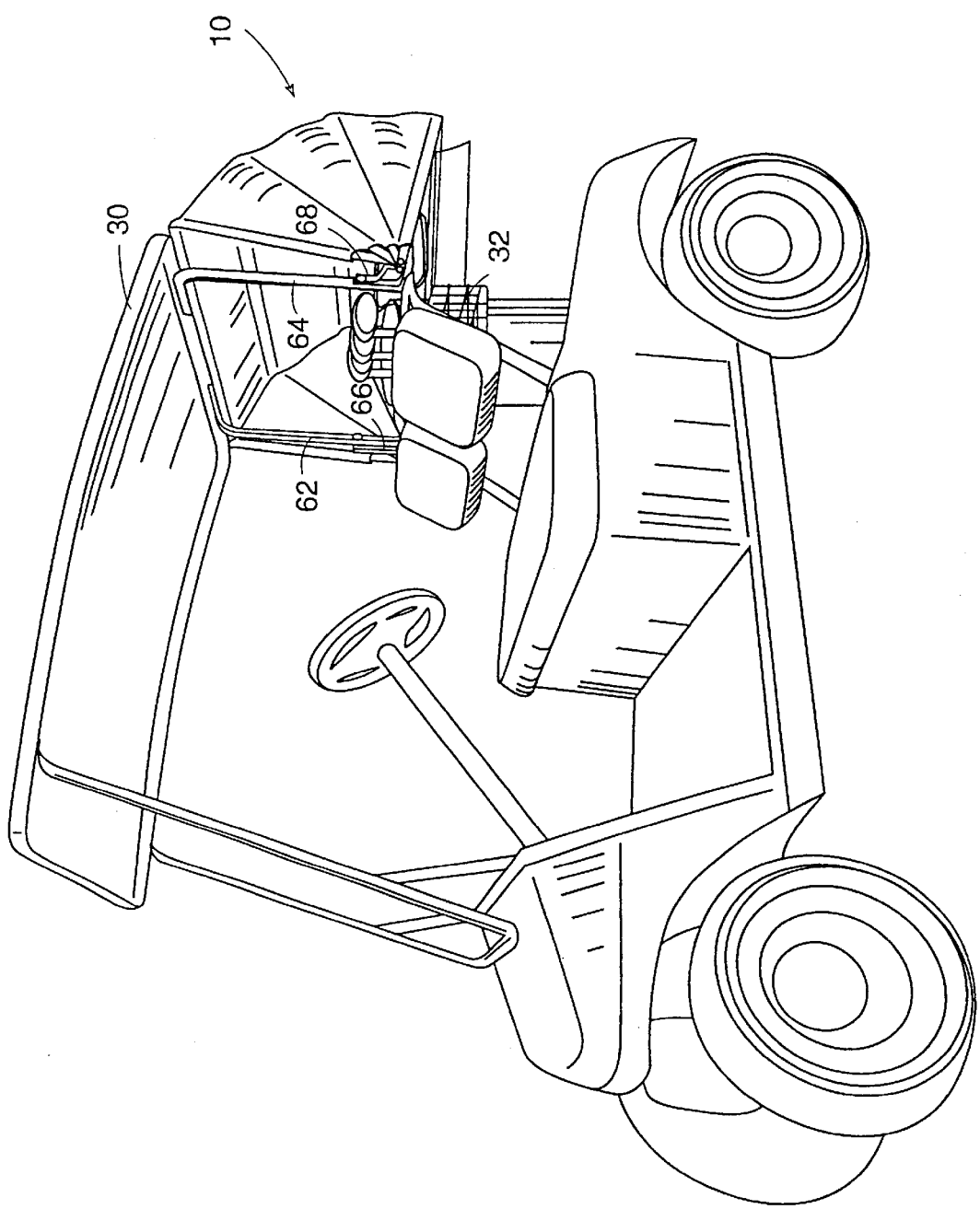
FIG. 4 is a perspective view of the awning in a deployed state on the back of a golf cart.

The awning attachment is fitted on to a golf cart as shown in FIG. 4. The forward edge of the frame structure, at the top edge of rib member 16, is connected to the underneath side of the rear section 30 of the cart's roof. Such connection can be made by providing drill holes in both the rib member and the roof to allow screwing or bolting the rib member directly into the roof section, or by any other appropriate connection means known to those skilled in the art. Preferably, the rib member should lie flush with the rear edge of the roof so that the awning remains as unobtrusive as possible. Due to the various different manufacturers of golf carts, and the various different roof designs produced by each, it may be difficult to attach the rib member flush up against the edge of the roof. This is because some roof edges may be non-rectilinear, and may have curved edges. In such instances, the rib member can not adjoin the roof edge in an aesthetically pleasing way, and, further, may not even be capable of being directly attached to the roof edge.

Figure 11:
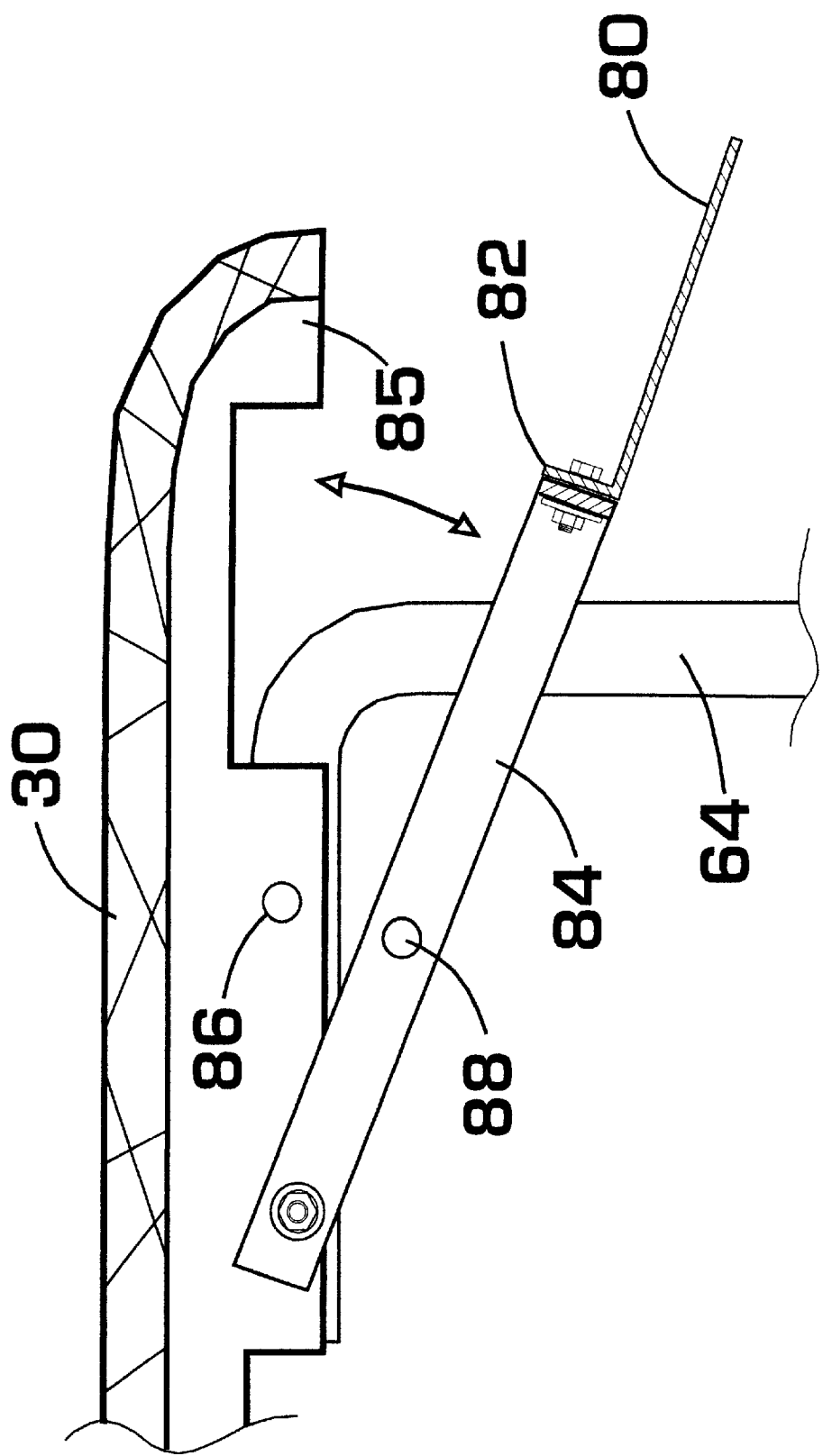
FIG. 11 is a cross-sectional view of the rear edge section of the roof of the cart showing the mounting bracket and transition plate for the alternate mounting arrangement shown in FIG. 8.
Figure 12:
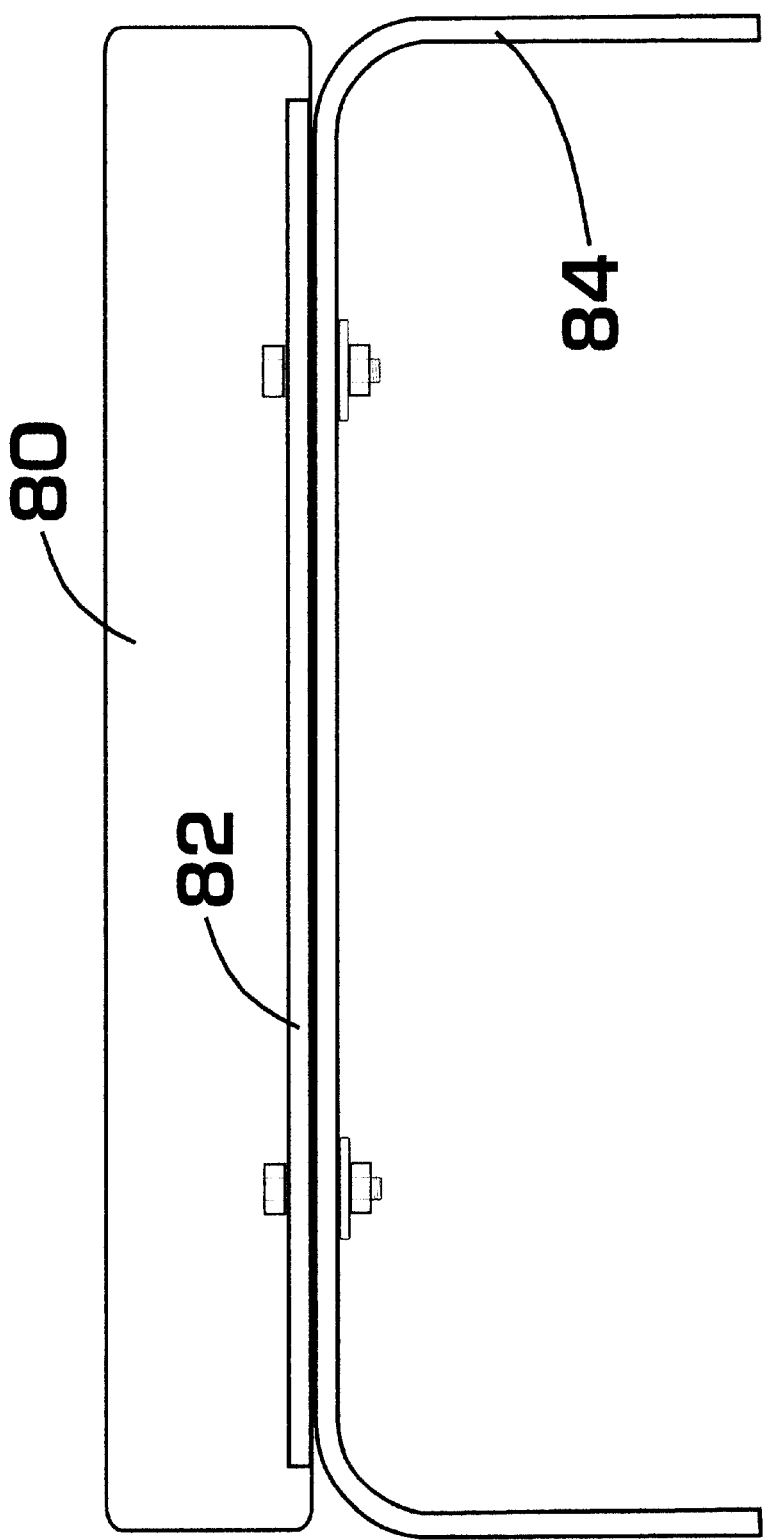
FIG. 12 is a top plan view of the mounting bracket and plate of FIG. 11.

To provide a surface for attachment of the awning at the rear edge of the cart roof, an extended transition plate member 80 against which rib member 16 may be secured is supplied. Plate member 80 is held in place by U-shaped top mounting bracket 84 as shown in FIGS. 11 and 12. Bracket 84 is secured to the underneath side of the roof of the golf cart which typically forms an interior flange 85 around the rear edge 30 of the roof. The shape of bracket 84 may be modified to accommodate the perimeter shape of the roof, which may be rectilinear or have rounded edges. Roof flange 85 can be provided with a plurality of apertures 86 around its perimeter, while bracket 84 may be provided with correspondingly placed apertures 88 to secure bracket 84 to the roof flange 85 by bolting or other appropriate fastening methods as shown in FIG. 11. Plate member 80 has a flange 82 at its forward end for connection with bracket 84 as shown in FIG. 12. Bracket 84 is optimally dimensioned such that flange 82 will be held between bracket 84 and roof flange 85.

The frame is further secured to the cart's upright, vertical support posts 62 and 64 through mounting clamps 66 and 68. These mounting clamps, as shown in FIG. 5, each comprise a metal strap 70 having a clamp 72 for engaging the cart's support post 62 or 64. Clamp 72 may comprise an open faced C-shaped channel having inwardly biased edges for holding support post in tight engagement. Alternately, a clamp having a tightening fastener, such as a threaded C-clamp, may be used. Further still, a clamp that surrounds the vertical post may be employed, and can be configured with a square or round opening to accommodate the appropriate geometrical cross section of the support post. Mounting clamps 66 and 68 each have an end 74 for mounting at pivot points 25 and 27 for the rib members of framework 12 as shown in FIG. 3. It is to be understood that the configuration of the vertical support posts of carts of different manufacturers may vary, with the posts being set wide in some cart models and set narrow in other cart models. As such, the distance of the pivot points 25 and 27 to the cart's supports will vary. To accommodate such different dimensions, the mounting clamps may be provided with different lengths of straps 70.

Figure 8:
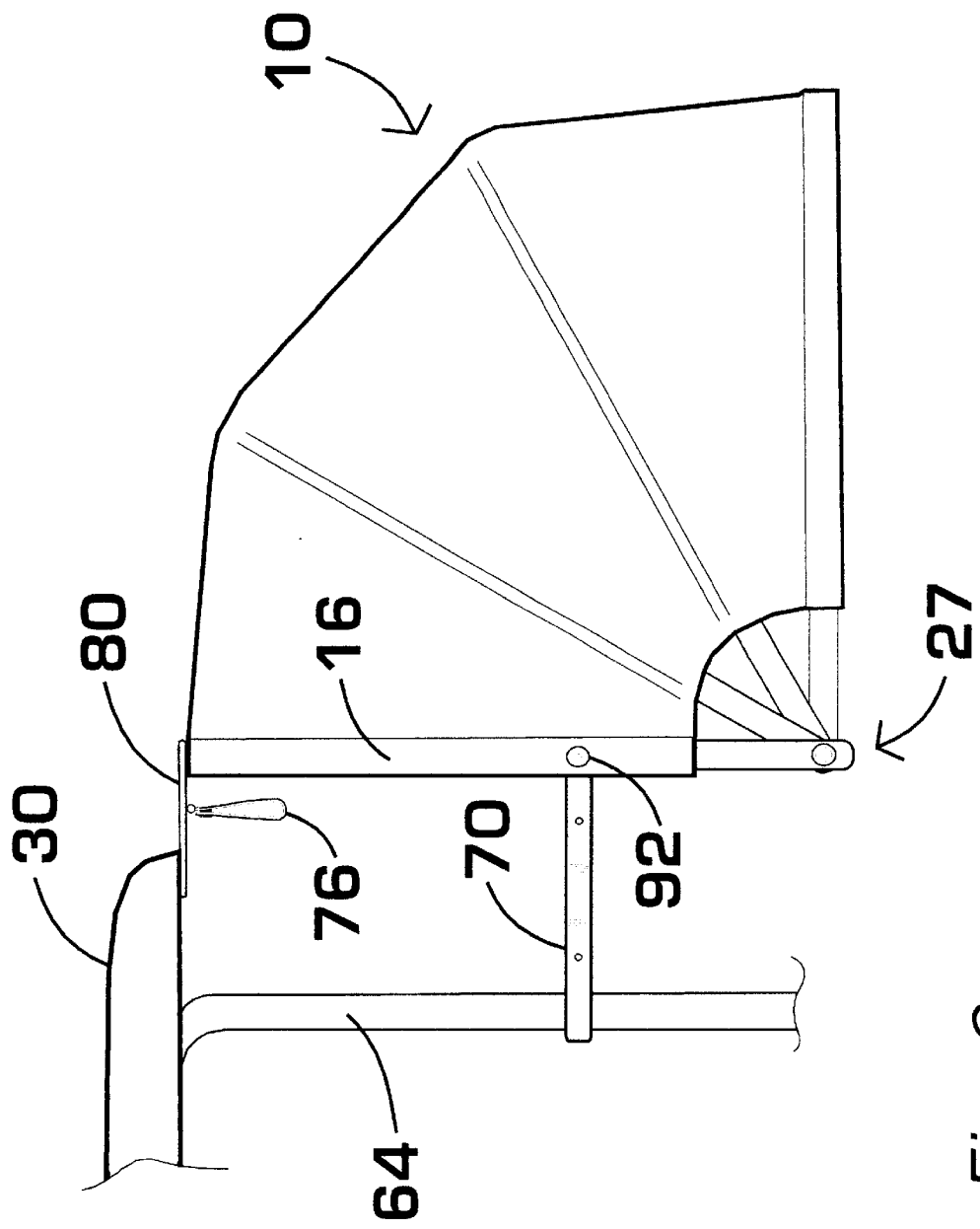
FIG. 8 is a view in side elevation of the awning mounted on the cart, in which alternate mounting arrangement is shown.
Figure 9:
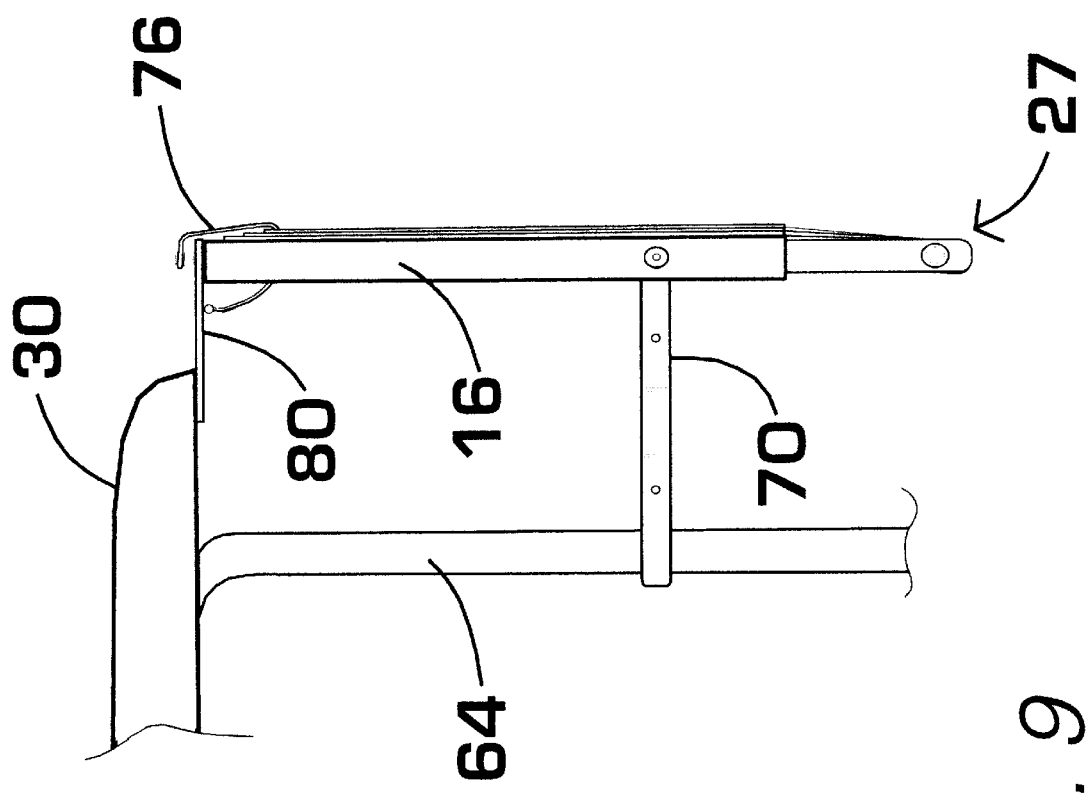
FIG. 9 is a view in side elevation of the awning mounted on the cart in the arrangement of FIG. 8, showing the rib members retracted.
Figure 13:
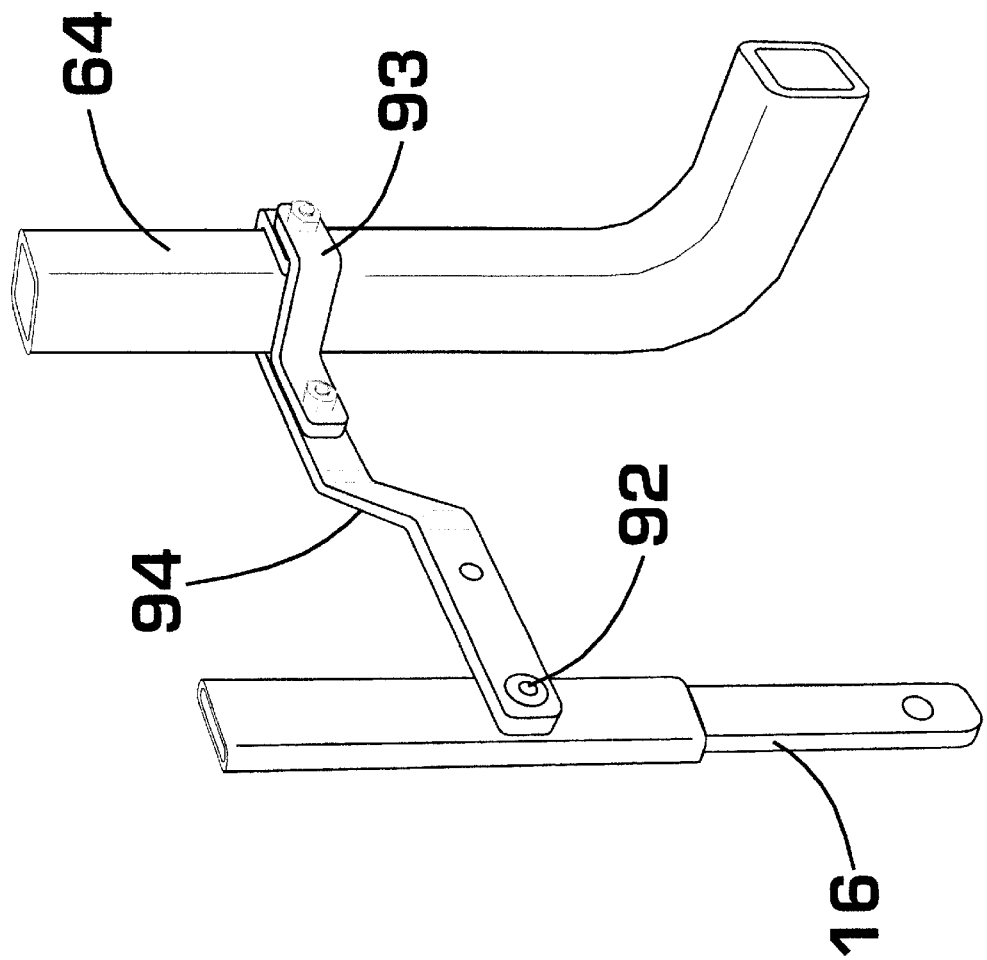
FIG. 13 is a perspective view of the bracing arm which connects the rib member of the awning to the vertical support post of the cart.

The frame may alternately be mounted to the vertical support posts of the golf cart from a position on rib member 16 remote from pivot points 25 and 27. In such cases, connecting metal straps 70 would be moved from the pivot point (as shown in FIG. 3) and instead be positioned along a median portion of rib member 16 as shown in FIGS. 8 and 9. This particular positioning of strap 70 on rib member 16 further provides a greater degree of overall stability to the attached awning, as pivot points 25 and 27 are sufficiently stable due to the interconnection of the rib members and do not need supplemental stabilization. Strap 70 may be simply connected to rib member 16 by bolting 92 or other appropriate fastener. The remote end 90 of strap 70 may be fastened to the cart's vertical support posts 62 and 64 by direct bolting, or may be provided with a clamp 93 for engagement around the support post. To accommodate the different spacing of the vertical support posts on carts of different manufacturers, strap 70 may be configured with an offset angle 94 as necessary to reach to a vertical post set wider than the awning as shown in FIG. 13. Likewise, the offset angle can be configured to connect to a vertical post set narrower than the awning.

Figure 7:
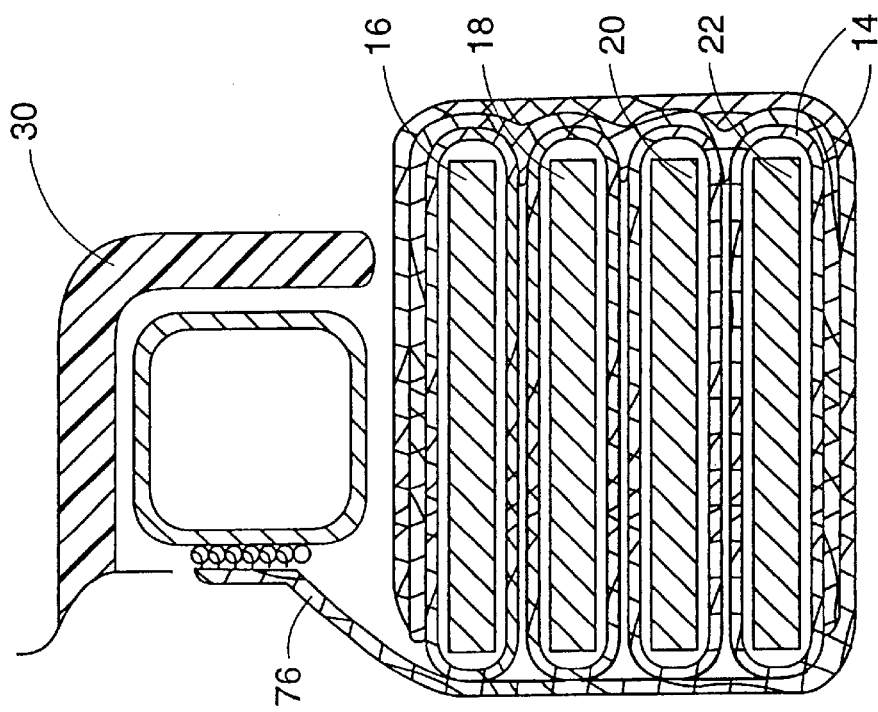
FIG. 7 is a cross-sectional view of the nested rib members comprising the awning framework taken in side elevation along lines 7—7 in FIG. 6.

To hold the loose fabric material of cover 14 in a neat bundle when the awning is in the closed, retracted position, a gathering flap 76 is provided on the top section of cover 14. FIG. 1 shows flap 76 extending along the substantial width of cross piece 36 of rib member 16, being secured to the fabric by sewing or the like along that end. The free end is provided with snaps or hook and loop fastening material. When the awning is in the open, deployed position, gathering flap 76 lies loosely on the top of fabric covering 14 on the back of the awning. It is not long enough, however, so that it dangles below the rear bottom edge of the awning. When the awning is folded up into its closed, retracted position, gathering flap is wrapped around the nested rib members and secured by its snaps or hook and loop fastening means to corresponding fastening means on the forward lateral edge of the framework of the awning or to the underneath side of the roof of the cart as shown in FIGS. 6 and 7.

Figure 10:
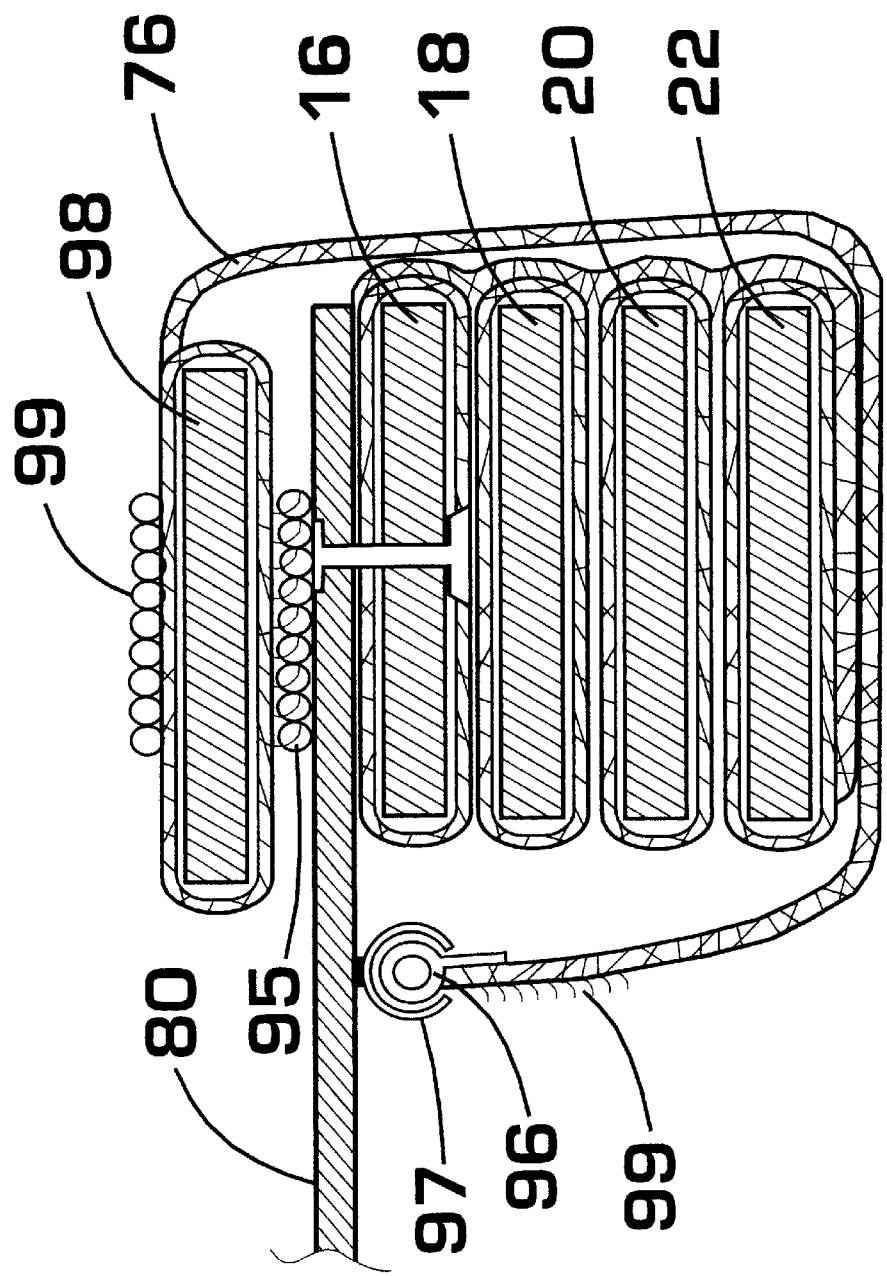
FIG. 10 is a cross-sectional view of the nested rib members in FIG. 9.

When the awning is attached to the golf cart by using extended transition plate member 80, the orientation of gathering flap 76 may be reversed, by securing the base end 91 underneath plate member 80 and configuring flap 76 to be drawn around the nested rib members and secured to the top of plate member 80, as shown in FIG. 10, by appropriate fastening means previously described. The gathering flap 76 may be constructed to be removable from its seducement under plate member 80 using various fastening means, such as a zipper, hook and loop fastening means, etc. For a reinforced connection, flap end 91 may be provided with a dowel or webbing member 96 at its edge, and a C-channel 97 may be secured underneath plate member 80 to slidably receive the dowel or webbing member of flap end. A stiffener member 98 may be provided at the remote end of flap 76 to provide a certain amount of weight and rigidity so the flap end will be resistant to curling and be made easier to handle. Also, a fastener 99 may be provided at the remote flap end so that flap 76 may be doubled back on itself when not in use.

By having the gathering flap extend the substantial width of the framework, it avoids unsightly bulging out of material that would be present if narrow gathering strips were instead used. As an additional advantage, the wide gathering flap allows for a clear vinyl pocket for printed material to be placed therein which presents a useful marketing tool for advertisers during golf tournaments.

Figure 14:
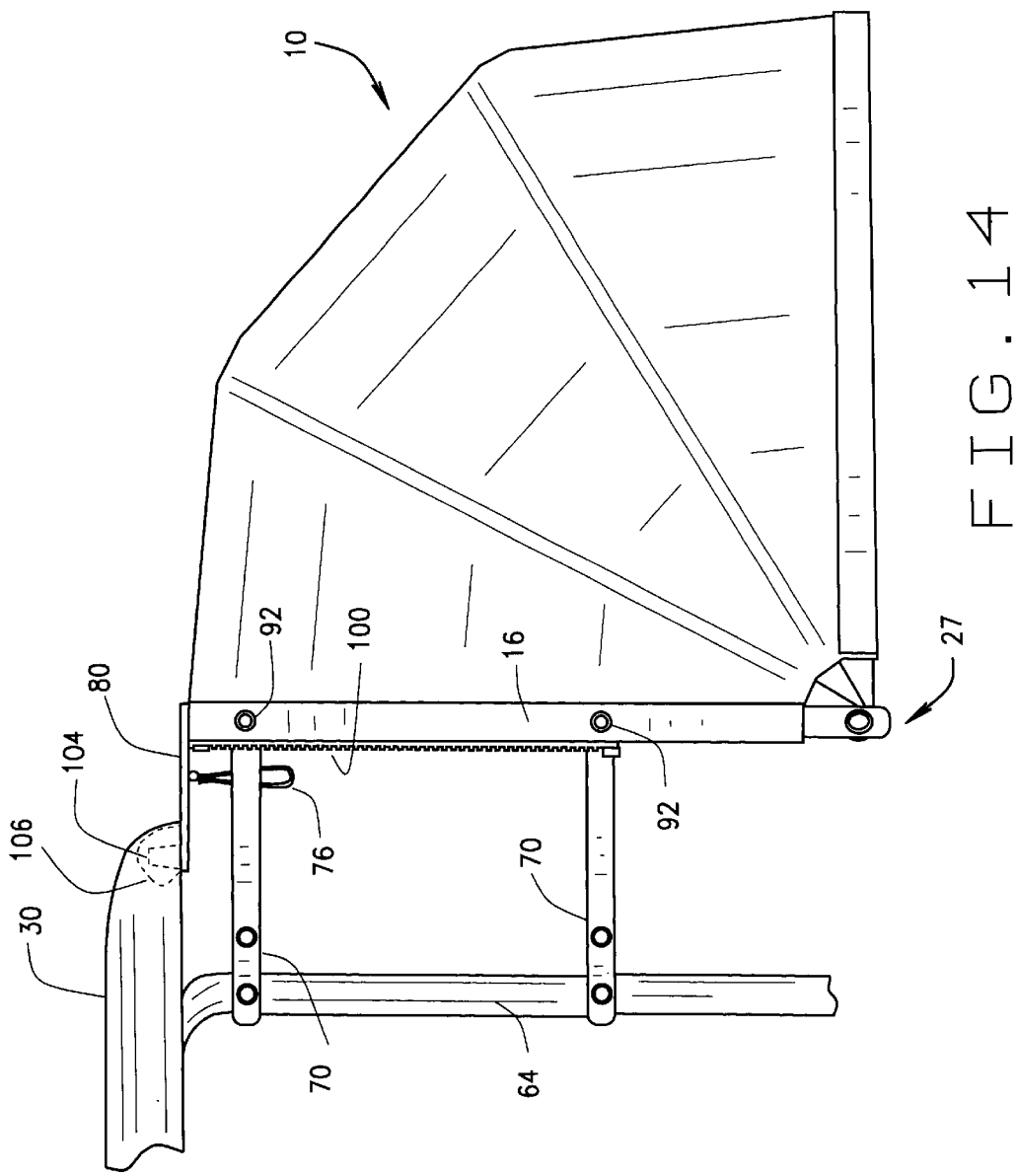
FIG. 14 is a view in side elevation of the awning mounted on the cart with a pair of bracing arms or brackets at each side thereof.
Figure 15:
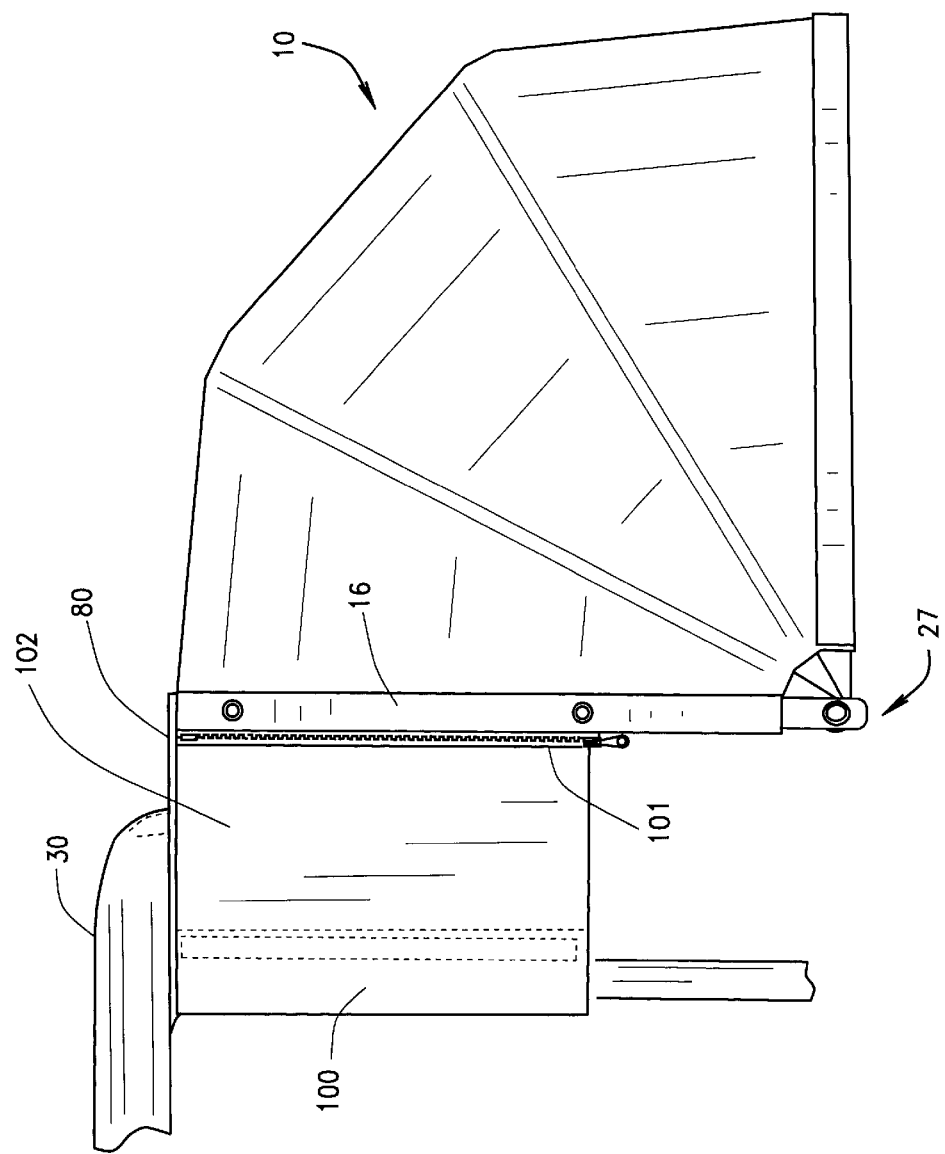
FIG. 15 is a side elevational view of the awning similar to that shown in FIG. 14 with the addition of fabric side panels zipper ed in place.

Referring to FIGS. 14 and 15, a zipper 100 or hook and loop material may be provided along an edge of the fabric cover for the selective placement of a fabric panel 102, as desired for shielding from view the connecting metal straps 70 which may be used to support the awning cover from the vertical support posts 62, 64. Furthermore, in the arrangement as shown in FIGS. 14 and 15, the transition plate 80 may not be secured to the rear section 30 of the cart's roof and instead may merely have an upstanding flange 104 with a protective cushion covering 106 for resiliently engaging the lip of the golf cart top 30. In this arrangement, the straps 70 provide the sole means of support for the awning cover from the vertical posts 62, 64. Although an arrangement shown in FIGS. 14 and 15 indicating that the transition plate 80 and its upturned flange 104 may be conveniently urged against the canopy top 30 of the golf cart, this need not be the case as the straps 70 may merely be repositioned to provide a space between flange 104 with cushioning member 106 and the golf cart top 30.

Figure 16:
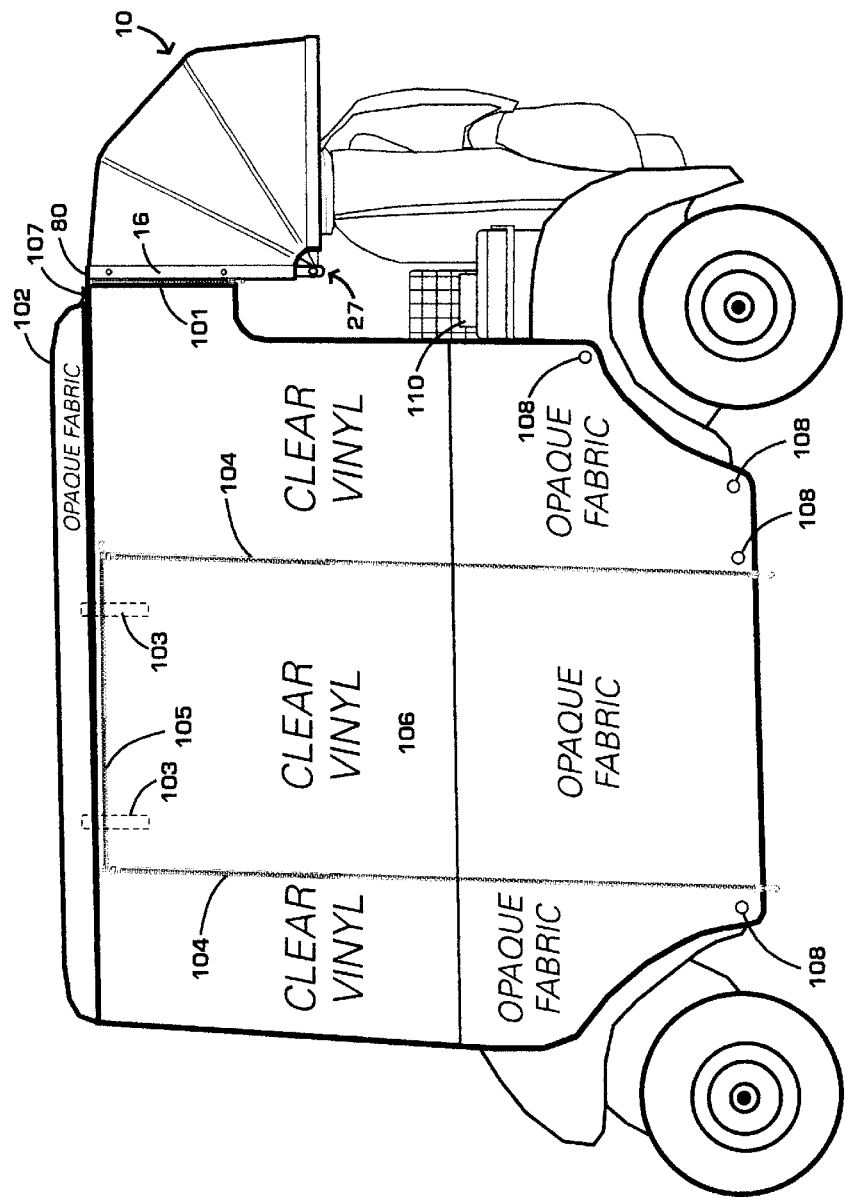
FIG. 16 is a side elevational view of a golf cart with a total enclosure and an awning cover mounted to the back of the golf cart.

As shown in FIG. 16, the awning cover 10 of the present invention is readily adaptable to being used with a total enclosure as is presently being marketed by others and which provides an all weather enclosure for the golf cart.

Figure 17:
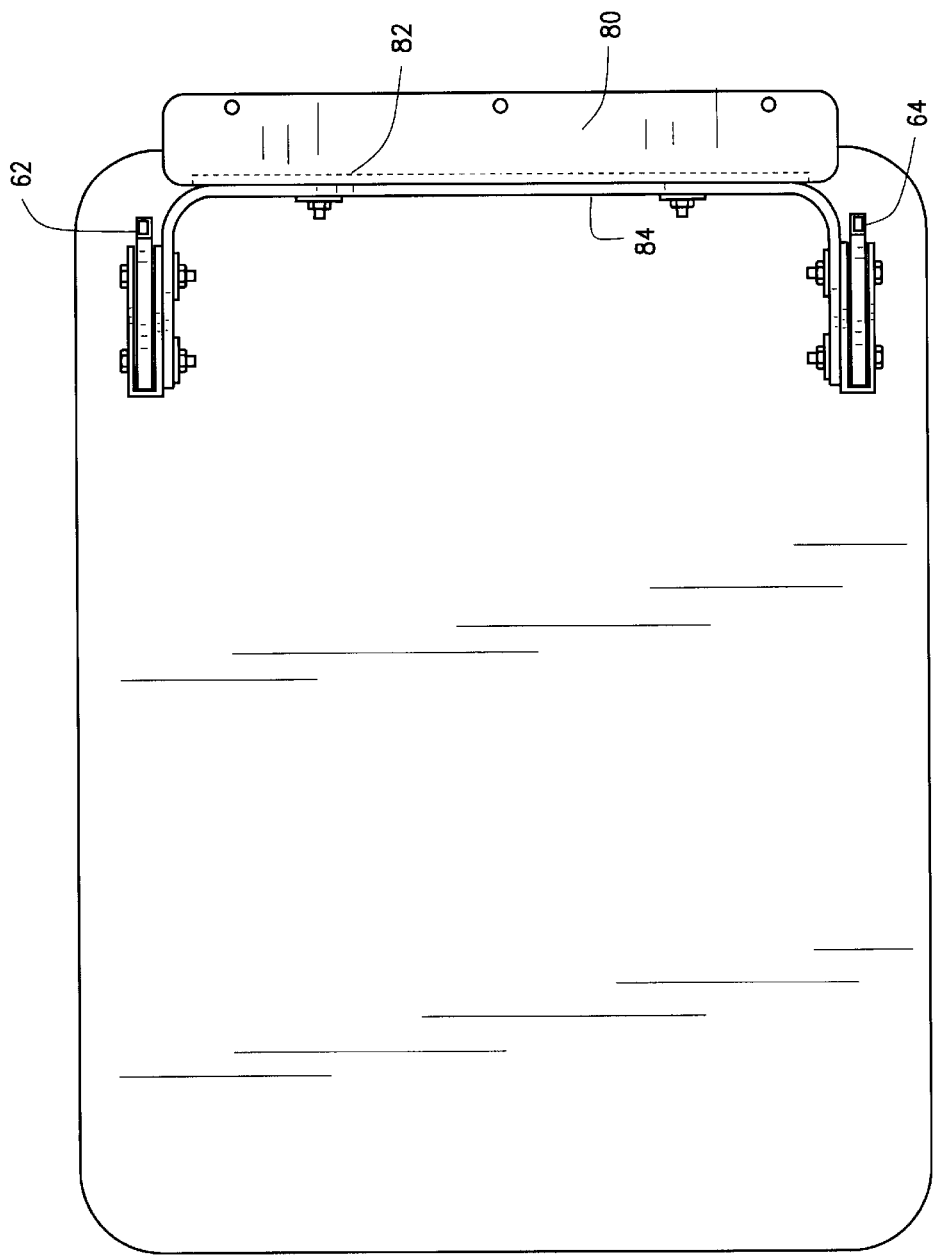
FIG. 17 is a bottom view of a canopy top for a golf cart detailing the top mounting bracket bolted to the vertical support posts of a cart as well as the transition plate.
Figure 18:
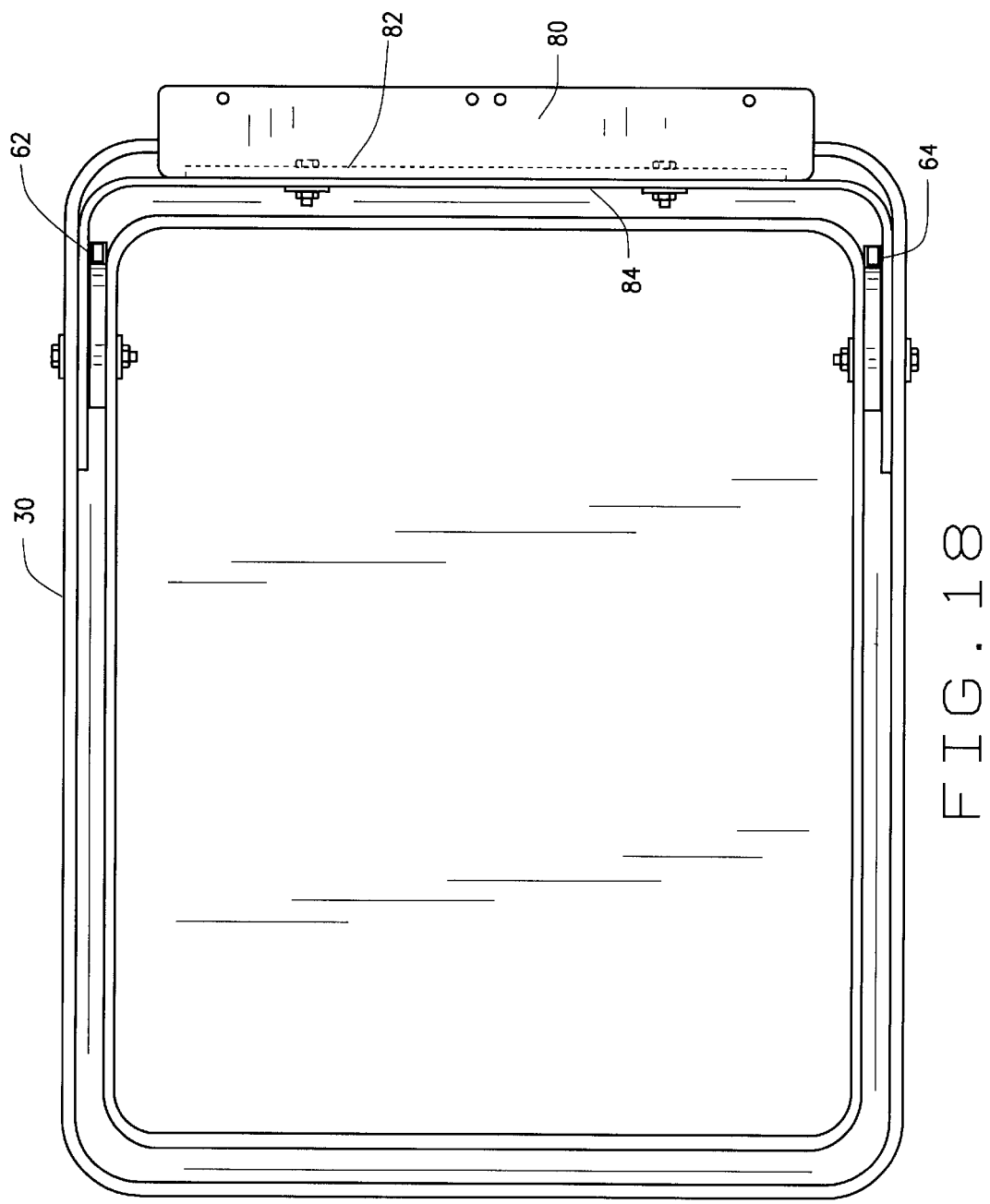
FIG. 18 is a bottom view of a canopy top of a golf cart different than that shown in FIG. 17 and detailing the location of the top mounting bracket in a different arrangement.

As shown in FIGS. 17 and 18, bracket 84 may be provided in different form to suit the canopy top arrangement as used by different manufacturers. In the arrangement as shown in FIG. 17, top mounting bracket 84 conveniently mounts with the existing pair of bolts at either side thereof to the vertical support posts 62, 64 and at their inner surfaces. On the other hand, as shown in the arrangement of FIG. 18, top mounting bracket 84 may conveniently fit between vertical support posts 62 and the plastic canopy cover 30 and, again, be held in place by bolted connections as shown. In either arrangement, top mounting bracket 84 provides a convenient flat planar surface against which the upturned flange 82 of transition plate 80 may be readily abutted and mounted with its own mounting bolts to provide a secure connection between the awning cover and the supporting framework of the golf cart top assembly.

Use

The retractable awning of the present invention provides a useful attachment to the rear of a golf cart to keep equipment dry during rainy periods. It is very simply employed by pulling apart the rib members in fan-like fashion to create the arcuate structure of the awning. When a golfer needs to access her equipment and reach for a club, she need merely raise the edge of the awning to a sufficient degree to be able to reach in to the golf bag. When the rainy conditions no longer exist, the framework is simply pivoted into its closed retracted state. The nesting arrangement of the rib members allows for a neat, compact arrangement. Gathering flap 76 is then wound around the rib members to neatly bundle the fabric material. The awning of the instant invention, however, need not only be used for rainy conditions; it can also be used as a screen to protect the cart occupants from the rays of the sun and or very windy days. Thus, the awning can be kept in its open deployed state all the time. If desired, a window 78 may be formed in the rear of the awning using transparent plastic or the like and a pocket or sleeve with transparent window may be provided for the ready insertion of advertising or signage.

Various changes and modifications may be made within this invention as will be apparent to those skilled in the art. Such changes and modifications are within the scope and teaching of this invention as defined in the claims appended hereto.

What is claimed is:

1. An awning attachment for a golf cart, said golf cart having a top supported by at least a pair of spaced apart upstanding support members located near a rear portion of said top, said awning attachment being mounted to said golf cart and including a transition plate, said awning attachment comprising a framework and a fabric cover, said fabric cover being secured to the framework and the framework being movable between an extended position whereat a rear portion of the cart is covered and a retracted position whereat the rear portion of the cart is exposed, the transition plate extending between the top and the awning attachment and extending along a substantial width of said awning attachment and the top to thereby substantially bridge any gap therebetween;

said awning attachment is adapted for attachment to and support solely from said support members; and further comprising a pair of support brackets secured to each of two opposing sides of the framework, said support brackets providing the structure for attachment and support of the awning attachment.

2. The awning attachment of claim 1 wherein said framework comprises a nesting plurality of U-shaped rib members, said rib members being pivotally connected substantially at their ends.

3. The awning attachment of claim 2 wherein said plurality of rib members comprises front and back rib members of the awning attachment, the fabric being secured to extend therebetween, and wherein the support brackets to one of said front and back rib members.

4. The awning attachment of claim 3 wherein said transition plate is mounted to the front rib member and extends between the golf cart top and the front rib member.

5. An awning attachment for a golf cart, said golf cart having a top supported by at least a pair of spaced apart upstanding support members located near a rear portion of said top, said awning attachment being mounted to said golf cart and including a transition plate, said awning attachment comprising a framework and a fabric cover, said fabric cover being secured to the framework and the framework being movable between an extended position whereat a rear portion of the cart is covered and a retracted position whereat the rear portion of the cart is exposed, the transition plate projecting outwardly from the awning attachment toward the golf cart top to a position where the transition plate overlaps with the golf cart top, the transition plate extending between the top and the awning attachment and extending along a substantial width of said awning attachment and along a substantial width of said top to thereby substantially bridge any gap therebetween.

6. The awning attachment of claim 5 wherein said awning attachment includes means for attachment to and support of the awning attachment solely from said support members.

7. The awning attachment of claim 5 wherein said awning attachment is mounted to said golf cart by at least said transition plate.

8. The awning attachment of claim 7 further comprising a top mounting bracket, said top mounting bracket being mounted to and extending between said spaced apart upstanding support members, said transition plate being mounted to said top mounting bracket.

9. The awning attachment of claim 8 wherein said transition plate includes an upstanding flange portion, said upstanding flange portion lying substantially adjacent to the top mounting bracket as the two are mounted to each other.

10. The awning attachment of claim 9 wherein the flange provides the mounting surface for attachment to the top mounting bracket.

11. The awning attachment of claim 10 wherein the transition plate is sufficiently sized to space the awning attachment near the rear of the golf cart to substantially cover the rear portion in its extended position.

12. The awning attachment of claim 5 wherein the transition plate overlaps the golf cart top underneath the golf cart top.

13. An awning attachment for a golf cart, said golf cart having a top supported by at least a pair of spaced apart upstanding support members located near a rear portion of said top, said awning attachment being mounted to said golf cart and including a transition plate, said awning attachment comprising a framework and a fabric cover, said fabric cover being secured to the framework and the framework being movable between an extended position whereat a rear portion of the cart is covered and a retracted position whereat the rear portion of the cart is exposed, the transition plate extending between the top and the awning attachment and extending along a substantial width of said awning attachment and the top to thereby substantially bridge any gap therebetween; and said framework comprises a nesting plurality of U-shaped rib members, said rib members being pivotally connected substantially at their ends.

14. The awning attachment of claim 13 wherein said framework includes one of said rib members at least at each of a front and back of the awning attachment, the fabric being secured to extend therebetween, and further comprising at least one support bracket mounted at either side of one of said rib members, each of said support brackets being mounted to one of the upstanding support members.

15. The awning attachment of claim 14 wherein said transition plate includes an upturned flange at a forward end thereof for fitting under a lip of the top to provide an overlapping joint, and a plurality of connectors for connecting the plate flange and top in said overlapping orientation.

16. The awning attachment of claim 15 further comprising a plurality of connectors for connecting the rear end of said transition plate to one of said rib members.

17. An awning attachment for a golf cart, said golf cart having a top supported by at least a pair of spaced apart upstanding support members located near a rear portion of said top, said awning attachment being mounted to said golf cart and including a transition plate, said awning attachment comprising a framework and a fabric cover, said fabric cover being secured to the framework and the framework being movable between an extended position whereat a rear portion of the cart is covered and a retracted position whereat the rear portion of the cart is exposed, the transition plate extending between the top and the awning attachment and extending along a substantial width of said awning attachment and the top to thereby substantially bridge any gap therebetween;

said awning attachment is adapted for attachment to and support from said support members, said awning framework comprises at least a U-shaped rib member located at a forward edge of said fabric cover and a U-shaped rib member located at a rear edge of said fabric cover; and said transition plate extends between the forward U-shaped rib member and the top of the golf cart, said transition plate having an upturned flange for fitting into the golf cart top.

18. The awning attachment for a golf cart of claim 17 further comprising a top mounting bracket mounted to the upstanding support members and extending across the rear of the cart, said transition plate being mounted thereto for supporting the awning attachment from the cart.

19. The awning attachment for a golf cart of claim 18 wherein said U-shaped rib members are pivotally connected to each other.

20. An awning attachment for a golf cart, said golf cart having a top supported by at least a pair of spaced apart upstanding support members located near a rear portion of said top, said awning attachment being mounted to said golf cart and including a transition plate, said awning attachment comprising a framework and a fabric cover, said fabric cover being secured to the framework and the framework being movable between an extended position whereat a rear portion of the cart is covered and a retracted position whereat the rear portion of the cart is exposed, the transition plate extending between the top and the awning attachment and extending along a substantial width of said awning attachment and the top to thereby substantially bridge any gap therebetween;

wherein said awning attachment is adapted for attachment to and support from said support members, said awning framework comprises at least a U-shaped rib member located at a forward edge of said fabric cover and a U-shaped rib member located at a rear edge of said fabric cover.

21. An awning attachment for a golf cart, said golf cart having a top supported by at least a pair of spaced apart upstanding support members located near a rear portion of said top, said awning attachment being mounted to said golf cart and including a transition plate, said awning attachment comprising a framework and a fabric cover, said fabric cover being secured to the framework and the framework being movable between an extended position whereat a rear portion of the cart is covered and a retracted position whereat the rear portion of the cart is exposed, the transition plate extending between the top and the awning attachment and extending along a substantial width of said awning attachment and the top to thereby substantially bridge any gap therebetween; and said fabric cover includes a corresponding plurality of fabric pockets, each of said fabric pockets receiving a U-shaped member of the framework for holding the fabric cover in close proximity to the framework as the awning attachment is used.

* * * * *